US009324995B2

(12) United States Patent
Ryhanen et al.

(10) Patent No.: US 9,324,995 B2
(45) Date of Patent: Apr. 26, 2016

(54) APPARATUS AND ASSOCIATED METHODS

(75) Inventors: Teuvo Tapani Ryhanen, Helsinki (FI); Di Wei, Cambridge (GB); Peter Andrew Matthews, Cambridge (GB); Piers Andrew, Cambridge (GB)

(73) Assignee: Nokia Technologies Oy, Espoo (FI)

(*) Notice: Subject to any disclaimer, the term of this patent is extended or adjusted under 35 U.S.C. 154(b) by 622 days.

(21) Appl. No.: 13/439,371

(22) Filed: Apr. 4, 2012

(65) Prior Publication Data
US 2013/0266877 A1 Oct. 10, 2013

(51) Int. Cl.
| H01M 4/04 | (2006.01) |
| H01M 4/58 | (2010.01) |
| H01M 8/22 | (2006.01) |
| H01M 4/131 | (2010.01) |
| H01M 4/136 | (2010.01) |
| H01M 4/66 | (2006.01) |
| H01M 4/80 | (2006.01) |
| H01M 10/36 | (2010.01) |
| H01M 12/06 | (2006.01) |
| H01G 9/048 | (2006.01) |
| H01G 11/24 | (2013.01) |
| H01M 4/70 | (2006.01) |
| H01G 9/04 | (2006.01) |

(52) U.S. Cl.
CPC .............. *H01M 4/131* (2013.01); *H01G 9/048* (2013.01); *H01G 11/24* (2013.01); *H01M 4/136* (2013.01); *H01M 4/661* (2013.01); *H01M 4/80* (2013.01); *H01M 10/36* (2013.01); *H01M 12/06* (2013.01); *H01G 2009/0412* (2013.01); *H01M 4/70* (2013.01); *Y02E 60/122* (2013.01); *Y02E 60/13* (2013.01)

(58) Field of Classification Search
CPC .......... H01M 4/70; H01M 4/80; H01M 4/136
USPC .................................................. 429/209, 405
See application file for complete search history.

(56) References Cited

U.S. PATENT DOCUMENTS

| 5,976,284 | A | 11/1999 | Calvert et al. ................... 156/51 |
| 6,565,763 | B1 | 5/2003 | Asakawa et al. ................ 216/56 |
| 6,768,246 | B2 | 7/2004 | Pelrine et al. ................. 310/339 |
| 2002/0009649 | A1 | 1/2002 | Sato et al. ...................... 429/306 |
| 2002/0155327 | A1 | 10/2002 | Faris ................................... 429/9 |
| 2005/0155215 | A1 | 7/2005 | Yoshino et al. .............. 29/623.1 |
| 2006/0008696 | A1 | 1/2006 | Cha et al. .......................... 429/38 |
| 2008/0138704 | A1 | 6/2008 | Mizuta et al. ................. 429/203 |
| 2009/0026513 | A1 | 1/2009 | Johansson |
| 2009/0130380 | A1* | 5/2009 | Asakawa et al. .............. 428/116 |
| 2009/0311587 | A1 | 12/2009 | Best et al. ..................... 429/127 |
| 2010/0118243 | A1 | 5/2010 | Majumdar et al. ........... 349/122 |
| 2010/0175354 | A1* | 7/2010 | Mizukami et al. .............. 55/528 |
| 2011/0027648 | A1 | 2/2011 | Rolison et al. ................ 429/209 |
| 2011/0059362 | A1* | 3/2011 | West et al. .................... 429/219 |
| 2011/0097624 | A1 | 4/2011 | Bhatt et al. ..................... 429/163 |
| 2011/0171518 | A1 | 7/2011 | Dunn et al. .................... 429/163 |
| 2011/0183180 | A1 | 7/2011 | Yu et al. .......................... 429/128 |
| 2011/0212545 | A1 | 9/2011 | Leenders et al. ................... 438/3 |
| 2011/0227059 | A1 | 9/2011 | Kim et al. ......................... 257/43 |
| 2011/0272028 | A1 | 11/2011 | Yun et al. ....................... 136/263 |
| 2012/0100422 | A1 | 4/2012 | Moriguchi et al. ........... 429/188 |

FOREIGN PATENT DOCUMENTS

| CN | 102354619 A | 2/2012 |
| EP | 0239846 A1 | 10/1987 |
| JP | 2001-151834 A | 6/2001 |
| JP | 2010-225432 A | 10/2010 |
| KR | 2012-0001456 A | 1/2012 |
| WO | WO-2007/059589 A1 | 5/2007 |
| WO | WO-2010/150857 A1 | 12/2010 |
| WO | WO-2011-014312 A1 | 2/2011 |

OTHER PUBLICATIONS

Yao et al., "Long cycle-life LiFePO4/Cu—Sn lithium ion battery using foam-type three-dimensional current collector", Journal of Power Sources 195 (2010) 2077-2081.*
P. Notten et al, "3-D Integrated All-Solid-State Rechargeable Batteries", Adv. Mater., 19, 4564 (2007) (4 pages).
L. Baggetto et al, "High Energy Density All-Solid-State Batteries: A Challenging Concept Towards 3D Integration", Adv. Fun. Mater., 18, 1057 (2008) (10 pages).
D. Lee et al, "Highly Ordered Nanoporous Template from Triblock Copolymer", ACS Nano, 5, No. 2, 1207 (2011) (8 pages).
M. Scherer et al, "Enhanced Electrochromism in Gyroid-Structured Vanadium Pentoxide", Adv. Mater., DOI: 10.1002/adma.201104272 (2012) (5 pages).
H. Zhang et al, "Three-dimensional bicontinuous ultrafast-charge and -discharge bulk battery electrodes", Nature Nanotechnology, 6, 277 (2011) (5 pages).
Crossland, Edward J.W., et al., "A Bicontinuous Double Gyroid Hybrid Solar Cell", © 2009 American Chemical Society, 17 pgs.
Long, Jeffrey W. et al., "Three-Dimensional Battery Architectures", © 2004 American Chemical Society, 30 pgs.
Bates, Frank S., et al., "Polymeric Bicontinuous Microemulsions", © 1997 The American Physical Society, 4 pgs.
Cheah, Seng Kian, et al., "Self-Supported Three-Dimensional Nanoelectrodes for Microbattery Applications", © 2009 American Chemical Society.
Pushparaj Victor L., et al. "Flexible Energy Storage Devices Based on Nanocomposite Paper", PNAD, Aug. 21, 2007, vol. 104, No. 34, 4 pgs.
Hu, Liangbing., et al., "Symmetrical MnO2—Carbon Nanotube-Textile Nanostructures for Wearable Pseudocapacitors with High Mass Loading", ACS Nano, 5,No. 11, 8904, 2011, whole document (10 pages).

(Continued)

*Primary Examiner* — Ladan Mohaddes
(74) *Attorney, Agent, or Firm* — Harrington & Smith

(57) ABSTRACT

An apparatus including a substrate and an active material, the substrate including an open interconnected wall structure of electrically conductive material having one or more pores, the open interconnected wall structure providing the substrate upon which the active material is supported, wherein the active material includes an electrically insulating lithium-based compound configured for use in generating and/or storing electrons, and wherein the open interconnected wall structure is configured to act as a charge collector for the generated and/or stored electrons through which an electrical path for the electrons is provided.

10 Claims, 10 Drawing Sheets

(56) References Cited

OTHER PUBLICATIONS

Pelrine, Ron, et al., "Dielectric Elastomers: Generator Mode Fundamentals and Applications", 2001 SPIE, whole document (9 pages).

Hu, Liangbing, et al., "Stretchable, Porous, and Conductive Energy Textiles", 2010 American Chemical Society, whole document (7 pages).

Kaltseis, Rainer, et al., "Method for Measuring Energy Generation and Efficiency of Dielectric Elastomer Generators", 2011 American Institute of Physics, whole document (3 pages).

Yu, et al., "Solution-Processed Graphene/MnO2 Nanostructured Textiles for High-Performance Electrochemical Capacitors", American Chemical Society, 2011, pp. 2905-2911.

Shim, et al., "Smart Electronic Yarns and Wearable Fabrics for Human Biomonitoring Made by Carbon Nanotube Coating with Polyelectrolytes", American Chemical Society, 2008, pp. 4151-4157.

Choi, et al., "Fully Rollable Transparent Nanogenerators Based on Graphene Electrodes", Wiley Inter Science, 2010, pp. 2187-2192.

Czech, et al., "Energy Harvesting Using Dielectric Elastomers", 2010, whole document (6 pages).

Graf, et al., "Multilevel High Voltage Converter Driving Dielectric Elastomer Generators", 2011, whole document (10 pages).

Kil, et al., "A Facile Approach to Fabricate Self-Standing Gel-Polymer Electrolytes for Flexible Lithium-Ion Batteries by Exploitation of UV-Cured Trivalent/Monovalent Acrylate Polymer Matrices", Macromolecular Chemistry and Physics, 2011, pp. 2217-2223.

Novak, et al., "Electrochemically Active Polymers for Rechargeable Batteries", (1997), pp. 207-281.

\* cited by examiner

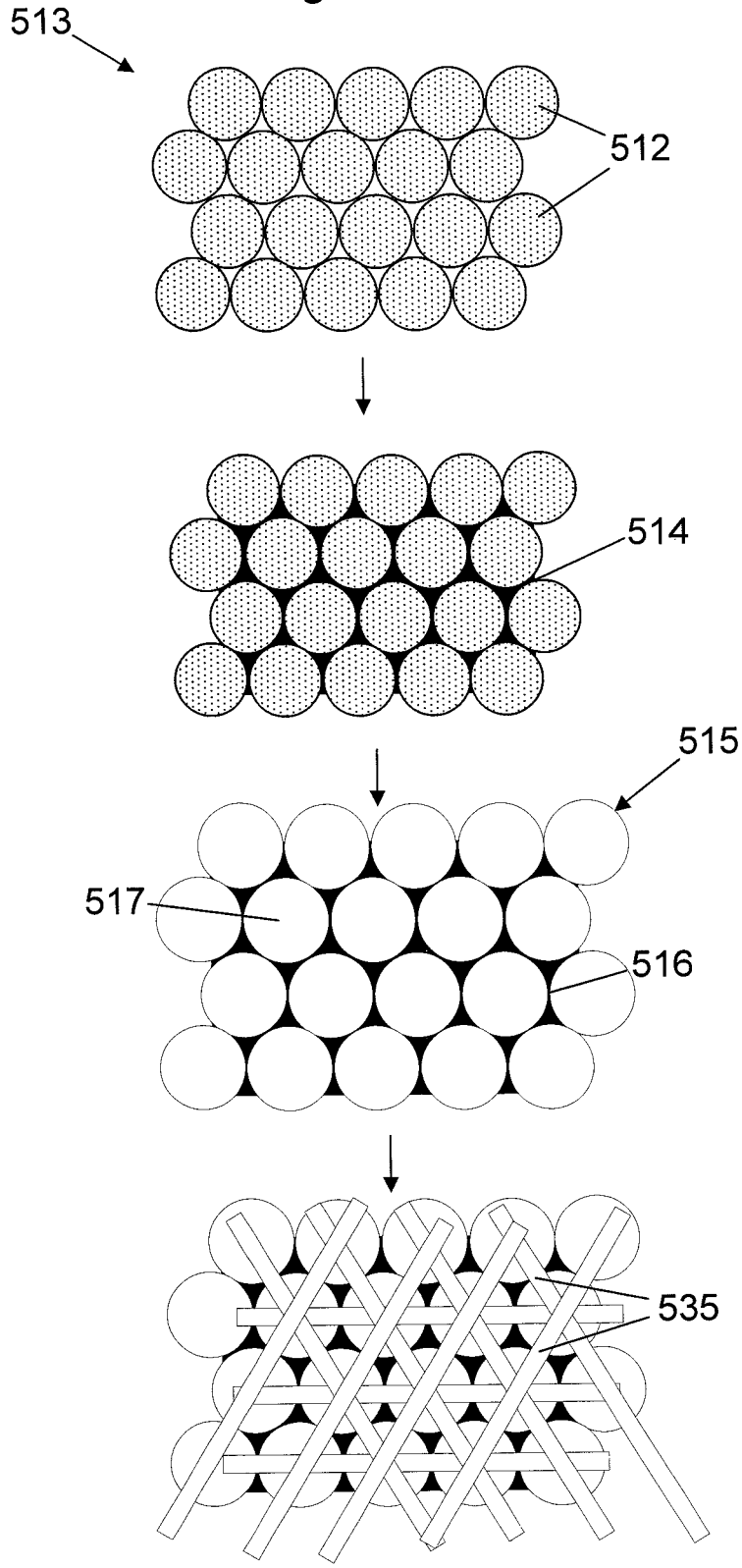

APPARATUS AND ASSOCIATED METHODS

TECHNICAL FIELD

The present disclosure relates to the field of electrical storage cells, associated methods and apparatus, and in particular concerns a high surface area electrode for use in lithium-based cells (batteries, capacitors or battery-capacitor hybrids) which may provide a safer alternative to the lithium metal electrodes currently used. The lithium-based cell may form part of an electronic device, in particular, so-called hand-portable electronic devices which may be hand-held in use (although they may be placed in a cradle in use). Such hand-portable electronic devices include mobile phones and so-called Personal Digital Assistants (PDAs).

The portable electronic devices may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Lithium batteries are widely used because of lithium's high electrode potential. This feature enables lithium batteries to produce higher output voltages than most other battery chemistries. One problem associated with lithium batteries, however, is that lithium metal is highly reactive and rigorously reacts with water to form lithium hydroxide and hydrogen gas. Even moisture in the surrounding air poses a potential safety risk. For this reason, non-aqueous electrolytes are normally used, and water is usually excluded from the battery pack using a sealed container.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising a substrate and an active material, the substrate comprising an open interconnected wall structure of electrically conductive material having one or more pores, the open interconnected wall structure providing the substrate upon which the active material is supported, wherein the active material comprises an electrically insulating lithium-based compound configured for use in generating and/or storing electrons, and wherein the open interconnected wall structure is configured to act as a charge collector for the generated and/or stored electrons through which an electrical path for the electrons is provided.

The term "electrically insulating" in reference to the lithium-based compound may be taken to mean that the lithium-based compound exhibits zero or a relatively low electrical conductivity. The term "open" in reference to the open interconnected wall structure may be taken to mean that one or more of the pores allow access to the internal surface area of the structure. The term "interconnected" in reference to the open interconnected wall structure may be taken to mean that at least some of the walls of the structure are in physical (and therefore electrical) contact with one another.

The substrate may be formed from an open interconnected wall structure of electrically conductive material. On the other hand, the substrate may comprise an open interconnected wall structure upon which a coating of electrically conducting material is deposited. In such a case, the open interconnected wall structure may not itself be electrically conductive, but the coating is. Either way, the substrate comprising the open interconnected wall structure can be used to support the active material and may act as a charge collector to provide an electrical path for the generated electrons.

The open interconnected wall structure may have a gyroid structure. The gyroid structure may be trigonometrically approximated by $$\cos x \cdot \sin y + \cos y \cdot \sin z + \cos z \cdot \sin x = 0 \qquad \text{Equation 1}$$

Some or all of the pores may be interconnecting. Some or all of the pores may form through channels within the substrate. Some or all of the pores may form blind channels within the substrate. Some or all of the pores may have a diameter of less than 2 nm (i.e. microporous). Some or all of the pores may have a diameter of between 2 nm and 50 nm inclusive (i.e. mesoporous). Some or all of the pores may have a diameter of greater than 50 nm (i.e. macroporous). Some or all of the pores may be arranged periodically.

The insulating lithium-based compound may comprise one or more of lithium sulphide and lithium oxide.

The active material may form a coating on the open interconnected wall structure of electrically conductive material. The term "active material" may be taken to mean an electrode material which takes part in the charging/discharging mechanism of the apparatus. In a battery, for example, the active material may be an electrode material which participates in an electrochemical reaction or intercalation mechanism. In a supercapacitor, on the other hand, the active material may be an electrode material which participates in the formation of an electric double layer.

The electrically conductive material may comprise one or more of a metal and a semiconductor. The metal may comprise one or more of gold, silver, nickel and copper.

The apparatus may be configured for the generation and/or storage of electrons. The expression "generation of electrons" may be taken to encompass the redox reactions and intercalation mechanisms associated with batteries and battery-capacitor hybrids, whilst the expression "storage of electrons" may be taken to encompass the charge separation associated with capacitors and battery-capacitor hybrids. The apparatus may be one or more of an electrical storage apparatus and an electrode for an electrical storage apparatus. The electrical storage apparatus may be one or more of a battery (primary or secondary battery), a capacitor (electrostatic, electrolytic, or supercapacitor), and a battery-capacitor hybrid. The electrical storage apparatus may be one or more of a lithium-sulphur battery and a lithium-air battery.

According to a further aspect, there is provided a device comprising any apparatus described herein. The device may be an electronic device, a portable electronic device, a portable telecommunications device, and a module for any of the aforementioned devices.

According to a further aspect, there is provided a method of making an apparatus, the method comprising depositing an active material on top of a substrate comprising an open interconnected wall structure of electrically conductive material having one or more pores, wherein the active material comprises an electrically insulating lithium-based compound configured for use in generating and/or storing electrons, and wherein the open interconnected wall structure is configured to act as a charge collector for the generated and/or stored electrons through which an electrical path for the electrons is provided.

The method may comprise forming the substrate before deposition of the active material.

Forming the substrate may comprise: depositing an electrically conductive material in the interconnected spaces between and defined by a plurality of particles of a lattice to create an interconnected wall structure of electrically conductive material; and removing the particles to create one or more pores in the interconnected wall structure to provide an open interconnected wall structure of electrically conductive material. Removing the particles may comprise one or more of etching, melting and dissolving the particles. Forming the substrate may comprise etching the electrically conductive material before removing the particles (e.g. to allow access to the particles). Forming the substrate may comprise etching the electrically conductive material after removing the particles (e.g. to increase the surface area of the open interconnected wall structure).

Forming the substrate may comprise coating the surfaces of a plurality of particles of a lattice, a block-copolymer, a sponge, or a base substrate with an electrically conductive material, the lattice, the block co-polymer, the sponge, or the base substrate having an open interconnected wall structure comprising one or more pores, the coating providing an open interconnected wall structure of electrically conductive material. Forming the substrate may comprise etching the base substrate to produce the one or more pores. Forming the substrate may comprise removing the particles, the block-copolymer, the sponge, or the base substrate after coating the surfaces (e.g. to reduce the weight of the apparatus and/or to increase the surface area of the open interconnected wall structure). Removing the particles, the block-copolymer, the sponge, or the base substrate may comprise one or more of etching, melting and dissolving the particles, the block-copolymer, the sponge, or the base substrate. Forming the substrate may comprise etching the electrically conductive material before removing the particles, the block-copolymer, the sponge, or the base substrate (e.g. to allow access to the particles, the block-copolymer, the sponge, or the base substrate). Forming the substrate may comprise etching the electrically conductive material after removing the particles, the block-copolymer, the sponge, or the base substrate (e.g. to increase the surface area of the open interconnected wall structure).

The particles of the lattice may or may not be spherical particles.

The active material may be deposited using one or more of atomic layer deposition, chemical vapour deposition, and electrochemical deposition.

The steps of any method disclosed herein do not have to be performed in the exact order disclosed, unless explicitly stated or understood by the skilled person.

According to a further aspect, there is provided a computer program, recorded on a carrier, the computer program comprising computer code configured to perform any method described herein.

The apparatus may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described example embodiments.

The above summary is intended to be merely exemplary and non-limiting.

BRIEF DESCRIPTION OF THE FIGURES

A description is now given, by way of example only, with reference to the accompanying drawings, in which:

FIG. 5 illustrates schematically one method of forming an open interconnecting wall structure using a lattice of spherical particles;

DESCRIPTION OF SPECIFIC
ASPECTS/EMBODIMENTS

In electrical circuits, batteries and capacitors are used to provide other components with electrical power. These power supplies operate in different ways, however.

Figure 1A:
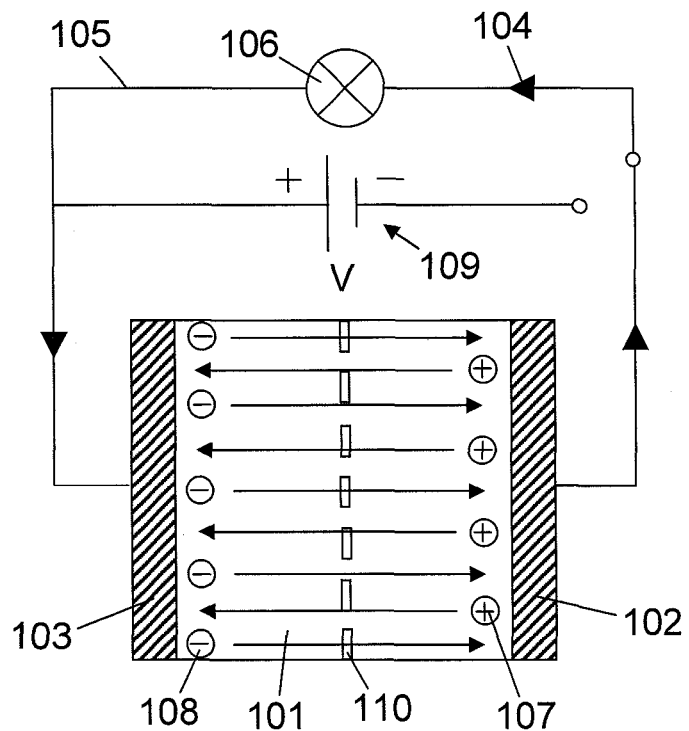
FIG. 1a illustrates schematically the discharge process of a conventional battery.

Batteries use electrochemical reactions to generate electricity. The discharge process of a conventional battery is shown in FIG. 1a. Batteries comprise two electrical terminals (electrodes 102, 103) separated by an electrolyte 101. A battery may also contain a separator 110 to prevent direct physical contact between the electrodes, which is particularly important when liquid electrolytes are used. At the negative electrode (the anode 102), an oxidation reaction takes place which produces electrons. These electrons flow round an external circuit 105 (indicated by the arrows 104) from the anode 102 to the positive electrode (the cathode 103) causing a reduction reaction to take place at the cathode 103. The flow of electrons can be used to power one or more electrical components 106 in the external circuit 105. The oxidation and reduction reactions may continue until the reactants are completely converted. Importantly though, unless electrons are able to flow from the anode 102 to the cathode 103 via the external circuit 105, the electrochemical reactions cannot take place. This allows batteries to store electricity for long periods of time. As the electrons flow round the external circuit from the anode 102 to the cathode 103, a negative charge cloud develops in the electrolyte 101 around the cathode 103, and a positive charge cloud develops in the electrolyte 101 around the anode 102. Positive 107 and negative 108 ions in the electrolyte 101 move to neutralise these charge clouds, allowing the reactions, and the flow of electrons, to continue. Without the ions 107, 108 from the electrolyte 101, the charge clouds around each electrode 102, 103 would inhibit the generation of electricity.

Figure 1B:
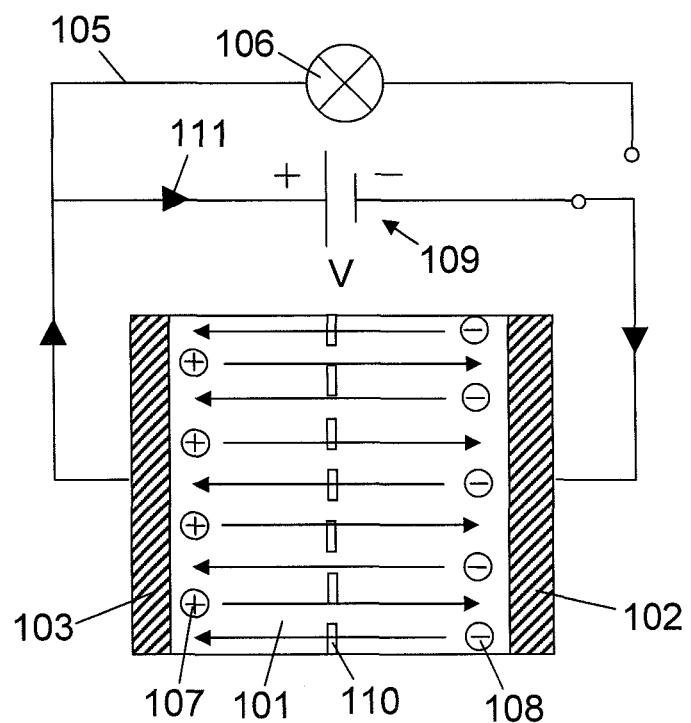
FIG. 1b illustrates schematically the charging process of a conventional battery.

A primary cell is any kind of battery in which the electrochemical reaction is irreversible. These are used as disposable batteries. With secondary batteries, on the other hand, the electrochemical reaction is reversible, meaning that the chemical reactants can be restored to their original states. These are used as rechargeable batteries. The charging process of a conventional rechargeable battery is shown in FIG. 1b. To charge the battery, a potential difference is applied between the anode 102 and cathode 103. The positive terminal of the charger 109 strips electrons from the cathode 103 and returns them to the anode 102 (indicated by the arrows 111), inducing chemical reactions at the electrode-electrolyte interface. Again, to compensate for the transfer of charge, positive 107 and negative 108 ions in the electrolyte 101 move between the electrodes 102, 103 in opposite directions to before.

The current and voltage generated by a battery is directly related to the materials used for the electrodes and electrolyte. The ability of a material to lose or gain electrons with respect to another material is known as its electrode potential. The strengths of oxidising and reducing agents are indicated by their standard electrode potentials. Materials with a positive electrode potential are used to form the anode, whilst those with a negative electrode potential are used to form the cathode. The greater the difference between the anode and cathode potentials, the greater the amount of electrical energy that can be produced by the cell.

Lithium appears at the top of the electrochemical series (large negative electrode potential), indicating that it is the strongest reducing agent. Likewise, fluorine appears at the bottom of the electrochemical series (large positive electrode potential), indicating that it is the strongest oxidising agent. As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically.

A lithium-ion battery is a different type of rechargeable battery which uses a lithium ion "intercalation" mechanism rather than traditional redox reactions. This involves the insertion of lithium ions into and out of the crystal structure of the electrodes as the ions pass back and forth between the electrodes during charging and discharging. To achieve this, the electrodes require open crystal structures which allow the insertion and extraction of lithium ions, and the ability to accept compensating electrons at the same time. Such electrodes are called "intercalation hosts". Lithium-ion batteries are currently one of the most popular types of battery for portable electronics because they exhibit one of the best energy-to-weight ratios, no memory effect, and a slow loss of charge when not in use.

In a typical lithium-ion battery, the anode is made from carbon, the cathode is a metal oxide, and the electrolyte is a lithium salt in an organic solvent. Commercially, the most popular anode material is graphite, and the cathode is generally one of three materials: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

Figure 2A:
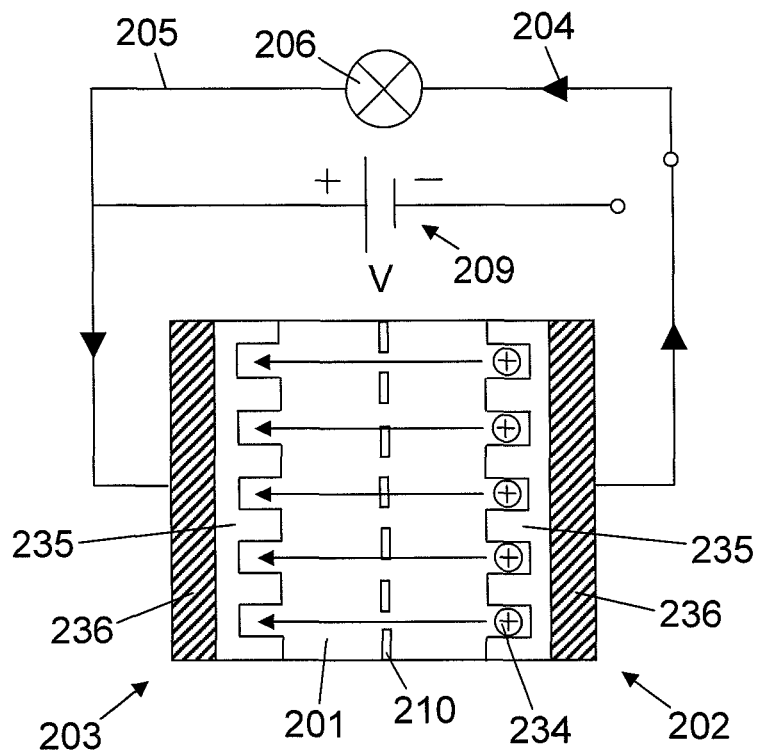
FIG. 2a illustrates schematically the discharge process of a lithium-ion battery.
Figure 2B:
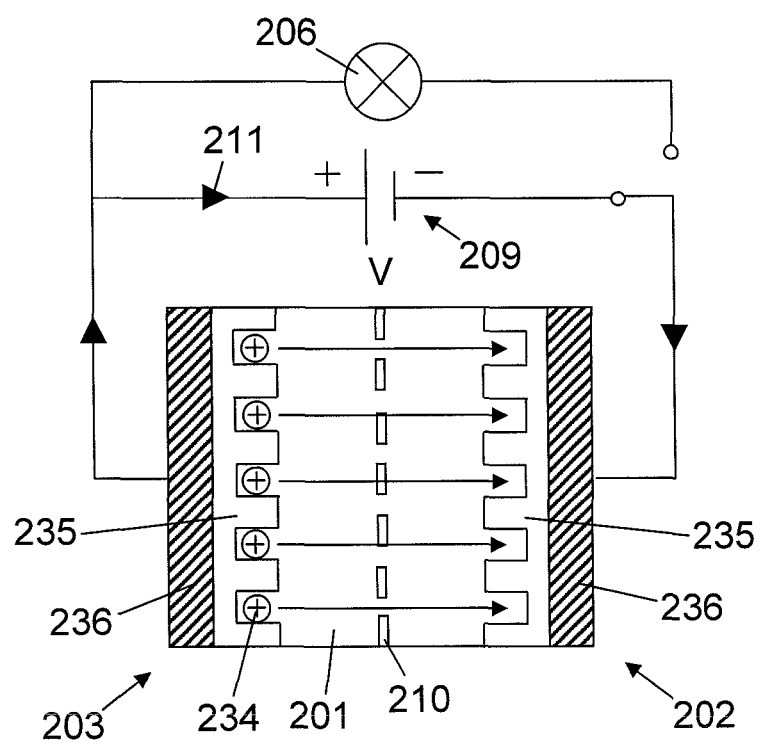
FIG. 2b illustrates schematically the charging process of a lithium-ion battery.

FIGS. 2a and 2b illustrate schematically the discharge and charging processes of a lithium-ion battery, respectively. As shown in the figures, the anode 202 and cathode 203 each comprise an open-crystal intercalation material 235 deposited on top of a charge-collecting substrate 236. During discharge, lithium ions 234 are extracted from the anode 202, migrate across the electrolyte 201, and are inserted into the crystal structure of the cathode 203. At the same time, compensating electrons travel in the external circuit (in a direction indicated by the arrows 204) and are accepted by the cathode 203 to balance the reaction. This process is reversible. During charging, an external electrical power source (the charger 209) applies a potential difference between the electrodes 202, 203 forcing the electrons to travel in the opposite direction (indicated by the arrows 211). The lithium ions 234 are then extracted from the cathode 203, migrate across the electrolyte 201, and are inserted back into the crystal structure of the anode 202.

In a lithium-ion battery, the lithium ions are transported to and from the cathode and anode, with the transition metal, cobalt (Co), in $Li_xCoO_2$ being oxidised from $Co^{3+}$ to $Co^{4+}$ during charging, and reduced from $Co^{4+}$ to $Co^{3+}$ during discharge. The anode and cathode half-reactions for a lithium-ion battery comprising a graphite anode and a lithium cobalt oxide cathode are as follows:

Anode $xLi^+ + xe^- + 6C \leftrightarrows Li_xC_6$      Equation 2

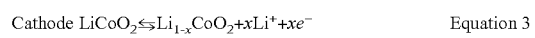

Cathode $LiCoO_2 \leftrightarrows Li_{1-x}CoO_2 + xLi^+ + xe^-$      Equation 3

The overall reaction has its limits, however. Overdischarging the lithium-ion battery can supersaturate the lithium cobalt oxide, leading to the production of lithium oxide, by the following irreversible reaction:

$Li^+ + LiCoO_2 \rightarrow Li_2O + CoO$      Equation 4 whilst overcharging the lithium-ion battery can lead to the synthesis of $Co^{4+}$ by the following irreversible reaction:

$LiCoO_2 \rightarrow Li^+ + CoO_2$      Equation 5

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

Figure 3A:
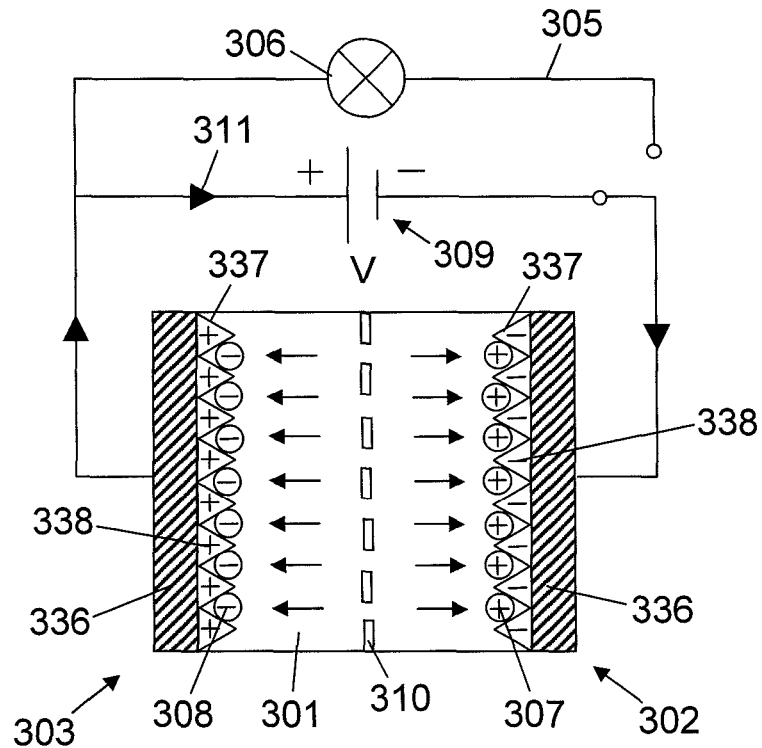
FIG. 3a illustrates schematically the charging process of a supercapacitor.
Figure 3B:
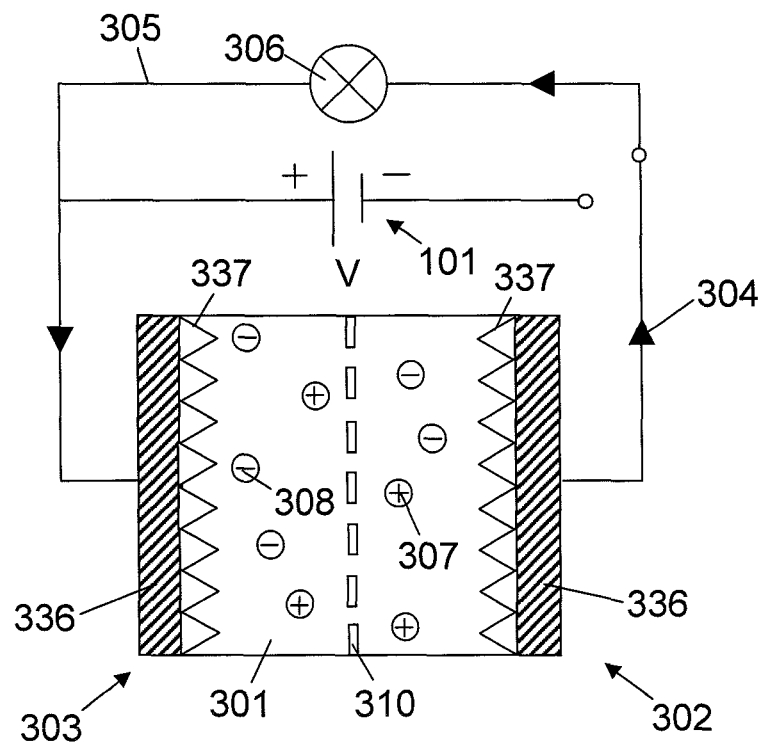
FIG. 3b illustrates schematically the discharge process of a supercapacitor.

FIGS. 3a and 3b illustrate schematically the charging and discharge processes of a supercapacitor, respectively. Supercapacitors have a cathode 303 and an anode 302, each comprising an electrically conducting plate 336 (charge collector), which are separated by an electrolyte 301. When a liquid electrolyte is used, the supercapacitor may also comprise a separator 310 to prevent direct physical contact between the cathode and anode. The plates 336 are coated in a porous material 337 (such as powdered carbon) to increase their surface area for greater charge storage. When a power supply (charger) applies a potential difference between the electrodes 302, 303, the electrolyte 301 becomes polarised. The potential on the cathode 303 attracts negative ions 308 in the electrolyte 301, and the potential on the anode 302 attracts positive ions 307.

Unlike batteries, the applied potential is kept below the breakdown voltage of the electrolyte 301 to prevent electrochemical reactions from taking place at the surface of the electrodes 302, 303. For this reason, supercapacitors cannot generate electricity like electrochemical cells. Also, without electrochemical reactions taking place, no electrons are generated. As a result, no significant current can flow between the electrolyte 301 and the electrodes 302, 303. Instead, the ions 307, 308 in solution arrange themselves at the surfaces of the electrodes 302, 303 to mirror the surface charge 338 and form an insulating "electric double layer". In an electric double layer (i.e. a layer of surface charge 338 and a layer of ions 307, 308), the separation of the surface charge 338 and ions 307, 308 is on the order of nanometers. The combination of the electric double layer and the use of a high surface area material 337 on the surface of the plates 336 allow a huge number of charge carriers to be stored at the electrode-electrolyte interface.

To discharge the supercapacitor, an electrical connection 305 is made between the charged electrodes 302, 303, causing electrons to flow from the anode to the cathode via the external circuit (as indicated by the arrows 304). This flow of charge can be used to power one or more electrical components 306 in the external circuit 305.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Lithium-ion batteries have the highest energy density of all systems, whilst supercapacitors have the highest power density and lifetime. Recently, a new hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density.

Furthermore, the capacity of the anode is several orders of magnitude greater than the capacity of the cathode. As a result, the change in anode potential during charging and discharging is far smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

Figure 4A:
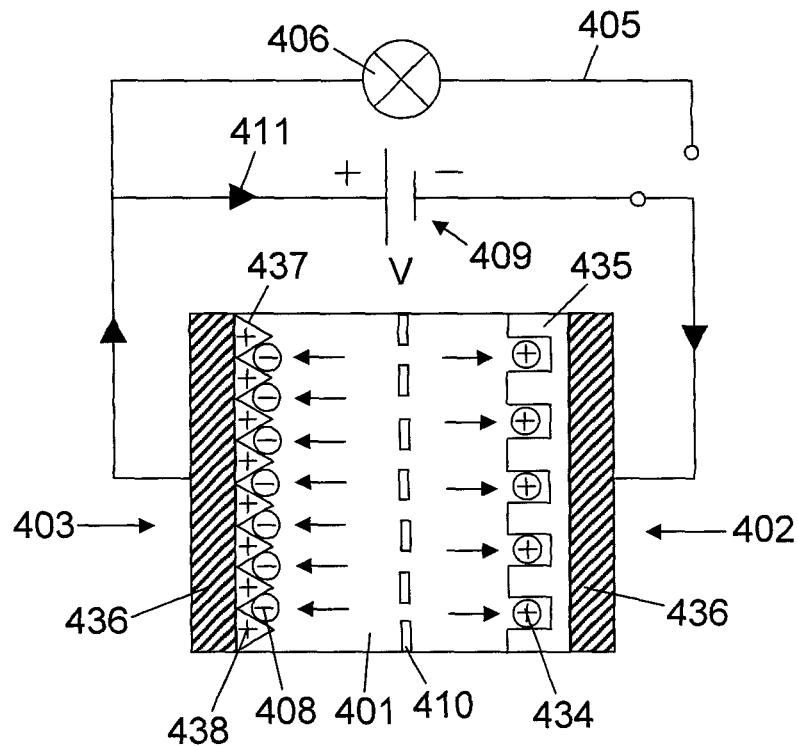
FIG. 4a illustrates schematically the charging process of a lithium-ion capacitor.
Figure 4B:
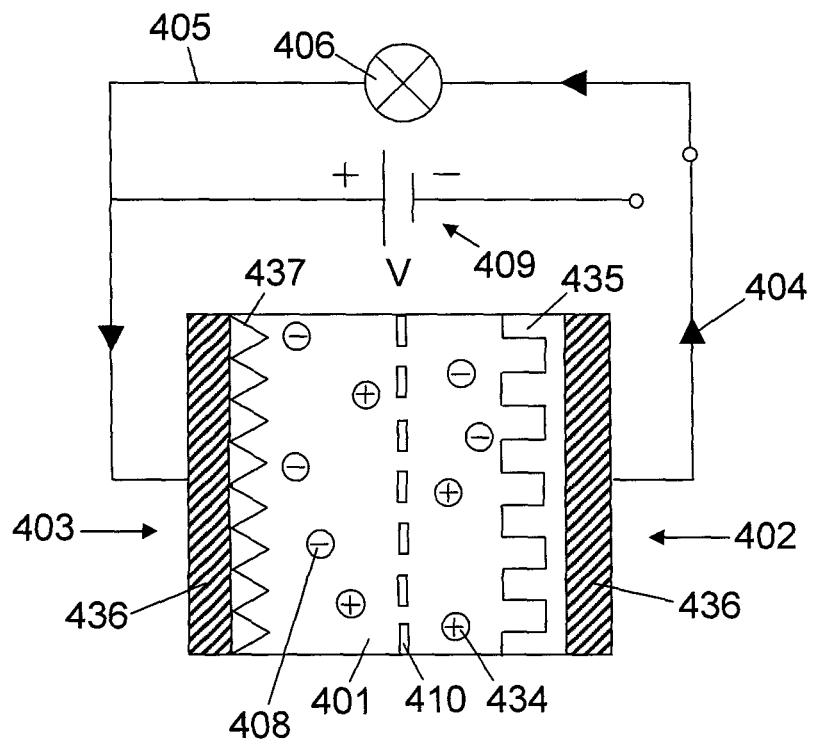
FIG. 4b illustrates schematically the discharge process of a lithium-ion capacitor.

FIGS. 4a and 4b illustrate schematically the charging and discharge processes of a lithium-ion capacitor, respectively. The behaviour of a lithium-ion capacitor is much the same as that of a supercapacitor, and therefore the reference numerals of FIGS. 4a and 4b correspond to similar features in FIGS. 3a and 3b. The main difference between the two systems, however, is that instead of positive ions in the electrolyte 401 arranging themselves at the electrode-electrolyte interface to form an electric double layer when the device charges, lithium ions 434 insert themselves (intercalation) into the crystal structure 435 of the anode 402. Like a lithium-ion battery, therefore, lithium-ion capacitors undergo fast electrochemical reactions and do not simply rely on the formation of an electric double layer to store electrical charge.

As stated in the background section, lithium metal is highly reactive with water and must therefore be protected from the surrounding environment by a hermetically-sealed container to prevent the cell from catching fire. There will now be described an apparatus and associated methods that may provide a solution to this problem.

The present apparatus comprises an electrode that uses an electrically insulating lithium-based compound as the active material instead of lithium metal. The specific compound varies depending on the chemistry of the electrical storage apparatus, but suitable examples include lithium sulphide (for use in a lithium-sulphur battery) and lithium oxide (for use in a lithium-air battery). By using a lithium-based compound, the reactivity problems associated with lithium metal are avoided. However, because the lithium-based compound is electrically insulating, the active material is deposited onto an electrically conductive charge collector as a coating. The charge collector therefore provides an electrical path to and from the active material for electrons to flow.

The material used to form the charge collector is an important consideration. To enable a sufficient flow of electrons, a highly conductive material such as a metal (e.g. gold, silver, nickel, copper, or an alloy comprising two or more of these metals) would preferably be used to form the charge collector. Nevertheless, a semiconducting material may be used instead.

To maximise the generation and collection of electrons, the surface area of the charge collector may be increased. Since the active material is deposited on top of the charge collector as a coating, the use of a high surface area material support increases the surface area of the active material and therefore the chances of interaction between the active material and the electrolyte. This configuration also allows electrons to be collected from any region of the electrode directly, rather than indirectly via a planar charge collector at the base of the electrode (which relies on electrical transport through the active material that can increase the resistance of the device).

The charge collector of the present apparatus comprises an open interconnected wall structure of electrically conductive material and one or more pores. It is important for structural rigidity and electrical conduction that the walls of the structure are interconnected, otherwise the resistance of the device would increase and additional materials would be required to bind the different pieces of the structure together to form the charge collector.

A number of different interconnected wall structures can be used provided that the structure is open (via external pores). The open nature of the structure allows the active material to be deposited on the internal surfaces of the charge collector, and also allows the electrolyte to interact with the active material deposited on the internal surfaces.

One example of an open interconnecting wall structure is a gyroid structure. This can be fabricated (as illustrated in FIG. 5) by arranging a plurality of spherical particles 512 (e.g. polystyrene particles) to form a lattice 513, and depositing the electrically conductive material 514 (e.g. by evaporation, sputtering, chemical vapour deposition (CVD), atomic layer deposition (ALD) or electrochemical deposition (ECD)) between the spherical particles 512.

CVD, ALD and ECD are particularly useful here because the deposition is independent on the orientation of the target surface. With evaporation and sputtering techniques, on the other hand, the target surface needs to be in the line-of-sight of the material source. Nevertheless, this issue can be addressed by using multiple material sources arranged to face different surfaces of the target structure, or by using a single material source and multiple deposition steps (and rotating the structure or material source between each deposition). Even if evaporation or sputtering are used to provide a complete coating, however, the coating is unlikely to have a uniform thickness due to the overlap from each deposition step. In this sense, CVD, ALD and ECD are preferable. ALD also has the advantage that it can produce pinhole free films. This factor is useful for forming a charge collector because pinholes in the electrically conductive material 514 can increase the electrical resistance of the device.

Once the electrically conductive material 514 has been deposited, the spherical particles 512 can be removed (e.g. by etching, melting or dissolving the particles) to create pores in the structure. If the electrically conductive material 514 has completely coated the external surfaces of the particles 512, some or all of the coating may need to be removed (e.g. by wet or dry etching such as galvanostatic or potentiostat etching) to allow access to, and removal of, the spherical particles 512. The resulting structure 515 (albeit shown in cross-section in FIG. 5) is a three-dimensional arrangement of interconnecting walls 516 with channels 517 (pores) therebetween.

At this stage, however, the pores 517 of the structure 515 are not necessarily interconnected (although the walls would be interconnected to provide mechanical/structural integrity). As a result, some of the internal pores 517 may be inaccessible to the active material and electrolyte, which reduces the useful surface area of the structure 515. This can be addressed (for example) by immersing the structure 515 in a bath of liquid (wet) etchant for a predetermined period of time. As the etching time increases, the number of interconnections 535 (and therefore the internal surface area of the material) increases, but the structural integrity decreases. The optimum etching time is therefore chosen to provide a sufficient surface area without compromising the rigidity of the structure 515, and will vary depending on the specific electrically conductive material 514 and etchant used.

Figure 6:
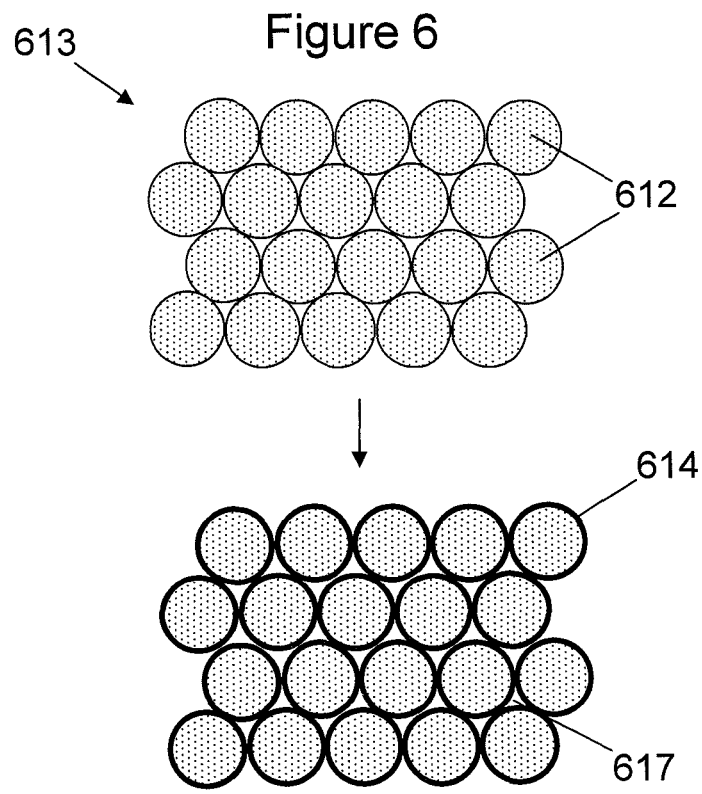
FIG. 6 illustrates schematically another method of forming an open interconnecting wall structure using a lattice of spherical particles.

FIG. 6 illustrates an alternative method of fabricating the open interconnected wall (gyroid) structure. This time, instead of filling the spaces between the spherical particles 612 of the lattice 613, the electrically conductive material 614 is deposited as a coating on the particles 612. This may be performed simply by depositing a smaller amount of electrically conductive material 614 so as to leave spaces between the particles 612. Since the spheres 612 are already packed together in the form of a lattice 613, the electrically conductive material 614 on the surface of one particle is in physical and electrical contact with the electrically conductive material on the surface of an adjacent particle. In this way, the resulting structure comprises a continuous layer of electrically conductive material 614 and a plurality of interconnecting channels 617. The electrically conductive material 614 also serves to bind the particles together, thereby improving the structural integrity.

Whilst the above-mentioned fabrication processes refer to "spherical" particles, these techniques may also be performed using any appropriately shaped/sized particles (not necessarily all the same shape/size) provided that they are able to form a lattice comprising one or more pores or channels.

Figure 7:
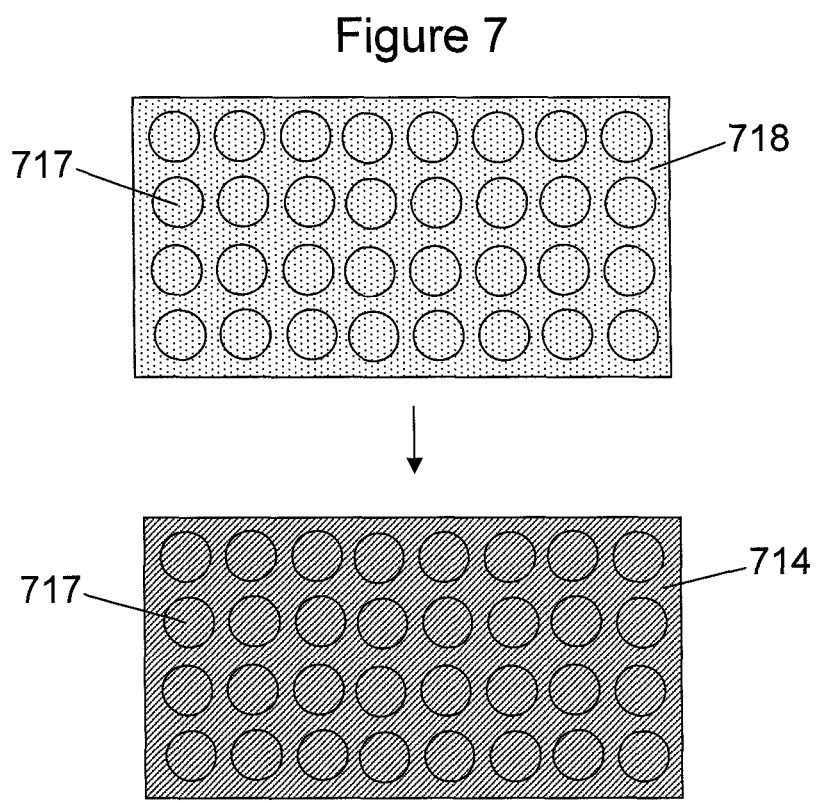
FIG. 7 illustrates schematically one method of forming an open interconnecting wall structure using a block co-polymer comprising one or more pores.

FIG. 7 illustrates another method of fabricating the open interconnected wall (gyroid) structure. Instead of coating a lattice of spherical particles as shown in FIG. 6, however, the electrically conductive material 714 is deposited onto a block co-polymer 718. Block copolymers 718 comprise two or more chemically distinct polymers (e.g. polystyrene and polyimide) linked together by a covalent bond at one end, and have the ability to self-assemble into a variety of ordered porous nanostructures. Depending upon the volume fraction of the components, block co-polymer nanoscopic domains (e.g. body-centred cubic spheres, hexagonally packed cylinders, lamellae, or bicontinuous gyroids) can be prepared under certain conditions. The molecular weight of the block co-polymer 718 and the individual blocks can be varied to control the size and separation distance of these nanoscopic domains.

Block copolymers 718 may comprise two or more homopolymer blocks. Block copolymers 718 with two or three distinct blocks are called diblock copolymers and triblock copolymers, respectively. Suitable diblock copolymers include poly(4-fluorostyrene)-b-poly(D,L-lactide) and poly(ethylene)-poly(ethylenepropylene), whilst a suitable triblock copolymer includes poly(1,4-isoprene)-block-polystyrene-block-poly(2-vinylpyridine). The cubic bicontinuous double gyroid phase of poly(4-fluorostyrene)-b-poly(D,L- lactide) allows the formation of an open interconnected wall structure in which the pores are fully interconnected.

The block co-polymer 718 in FIG. 7 comprises a plurality of ordered pores 717. When a layer of electrically conductive material 714 is deposited onto the block co-polymer (preferably using CVD, ALD or ECD), it coats the external surface of the material 718 as well as the internal surfaces of the pores 717. The resulting structure therefore comprises a continuous layer of electrically conductive material 714. The arrangement of the pores 717 within the structure will depend on the specific polymers and the fabrication conditions. In some cases the pores 717 may be interconnected, but in other cases they may not be. Interconnection of the pores is not absolutely necessary, but can facilitate the movement of ions in the electrolyte to and from the active material during the charging and discharging operations of the electrical storage apparatus.

Figure 8:
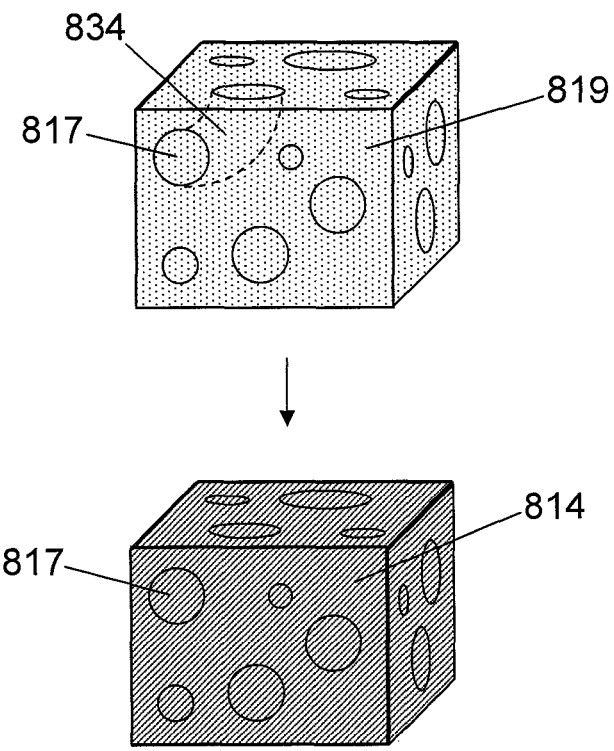
FIG. 8 illustrates schematically one method of forming an open interconnecting wall structure using a sponge comprising one or more pores.

Rather than depositing the electrically conductive material onto a block co-polymer, it may be deposited on top of a sponge 819 (natural or synthetic) as shown in FIG. 8. Sponges 819 typically comprise a plurality of (interconnecting) pores 817 and have an inherently high surface area. The external and internal surfaces of the sponge 819 can therefore be coated with the electrically conductive material 814 to create an open interconnected wall structure which is suitable for use as a charge collector. As with the block co-polymer, it is not essential that the pores 817 are connected to one another, but interconnected pores are beneficial.

Figure 9:
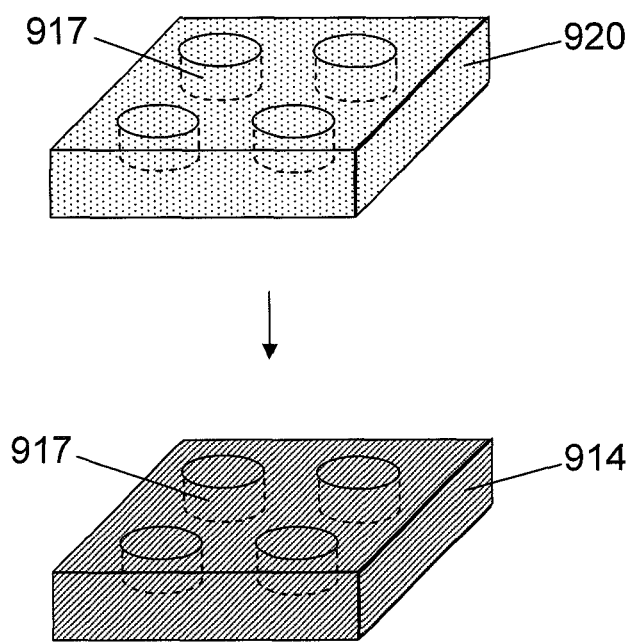
FIG. 9 illustrates schematically one method of forming an open interconnecting wall structure using a base substrate comprising one or more pores.

Another alternative is to deposit the electrically conductive material 914 onto a substrate 920 (referred to herein as the base substrate) comprising one or more preformed holes 917 (pores), as shown in FIG. 9. The pores 917 may be formed in the substrate 920 using a variety of techniques (e.g. drilling or etching through an etch-resistance mask). In this way, the number, density, diameter, depth and shape of the pores 917 can be controlled. It is also possible to control whether the pores 917 interconnect with one another or not. By coating the external and internal surfaces of the base substrate 920, an open interconnected wall structure may be produced which is suitable for use as a charge collector.

The pores in the open interconnected wall structure may form through channels (i.e. from one side of the material to the other, as denoted by reference numeral 834) or blind channels (i.e. open at one side of the material but terminating inside the material, as denoted by reference numeral 717). In addition, the pores may (e.g. pores 717) or may not (e.g. pores 817) be arranged periodically, and may have a diameter of less than 2 nm (microporous), between 2 nm and 50 nm inclusive (mesoporous), or greater than 50 nm (macroporous).

Figure 10:
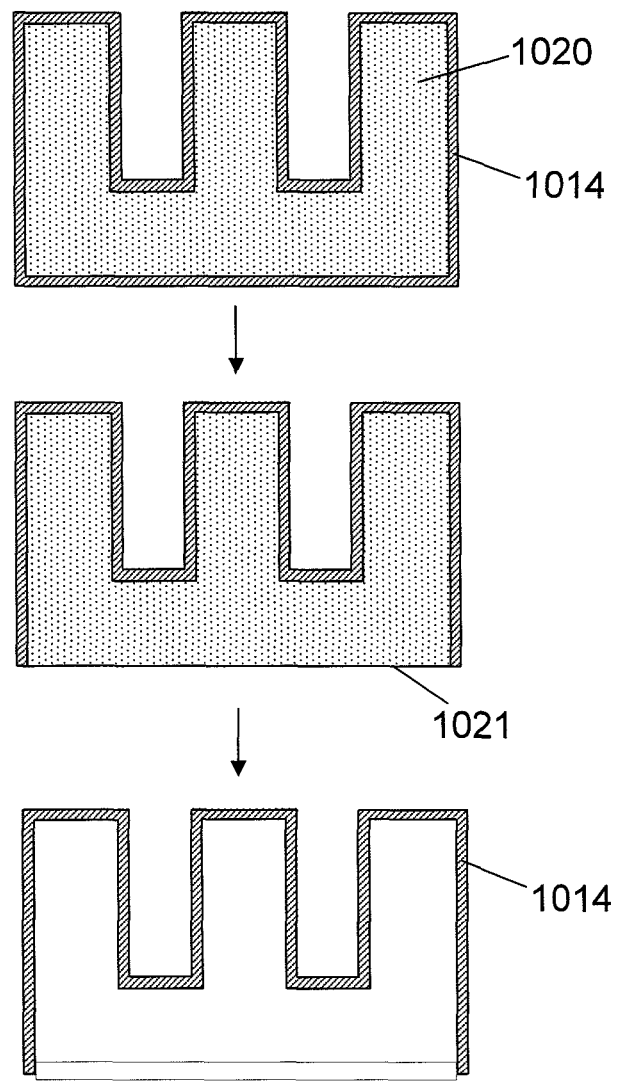
FIG. 10 illustrates schematically removal of the base substrate after deposition of the electrically conductive material.

In each of the fabrication processes illustrated in FIGS. 6-9, there is no need to remove the support material (spherical particles, block co-polymer, sponge or base substrate) upon which the electrically conductive material is deposited. However, removal of the support material can be useful for two reasons. First of all, it can reduce the overall weight of the electrical storage device (which is an important factor given that storage cells are often characterised by their energy-to-weight ratio). Secondly, removal of the support material increases the surface area of the structure. This aspect is illustrated in FIG. 10 which shows the base substrate 1020 of FIG. 9 after being coated by the electrically conductive material 1014. To remove the support material 1020 (base substrate in this case), part of the electrically conductive material 1014 may need to be removed to provide access to the underlying material 1020. This step may be performed by etching. In the figure shown, the electrically conductive material 1014 at the lower surface 1021 of the base substrate 1020 has been removed. Once the substrate material 1020 is exposed, a wet etch (or an alternative technique) can be used to remove the substrate material 1020. It is important, however, that the electrically conductive material 1014 is more resistance to the etchant than the substrate material 1020, otherwise this step could partially or completely remove (or damage) the electrically conductive material. An alternative option may be to use an etch resistant mask to prevent interaction between the etchant and the electrically conductive material 1014. Removal of the substrate material 1020 results in an interconnected wall structure of electrically conducting material 1014 which is lightweight, open and porous, with a high surface area.

Figure 11:
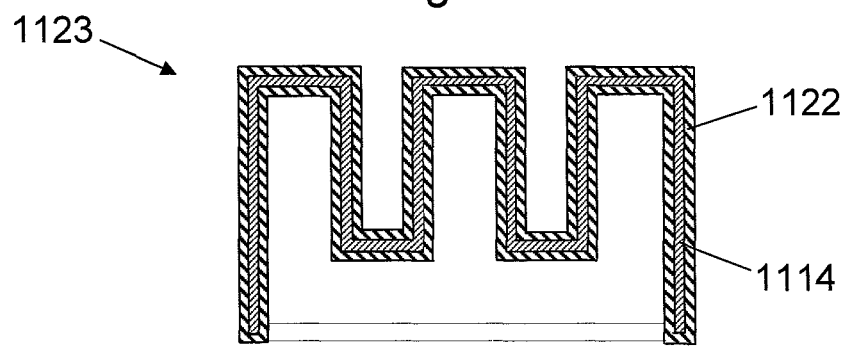
FIG. 11 illustrates schematically deposition of an active material on top of the electrically conductive material.

Once the open interconnected wall structure has been formed, the active material 1122 can be deposited onto the electrically conductive material 1114 to form the electrode 1123 (as shown in FIG. 11). As with deposition of the electrically conductive material 1114 onto the support material (e.g. base substrate), CVD, ALD and ECD are particularly useful because they can be used to coat surfaces which are not in the line-of-sight of the material source in an evaporation or sputtering system. It is not necessary to coat the entire surface area of the open interconnected wall structure with the active material 1122, but doing so maximises the generation of electrons because the electrolyte is able to interact with a greater amount of active material 1122.

Figure 12:
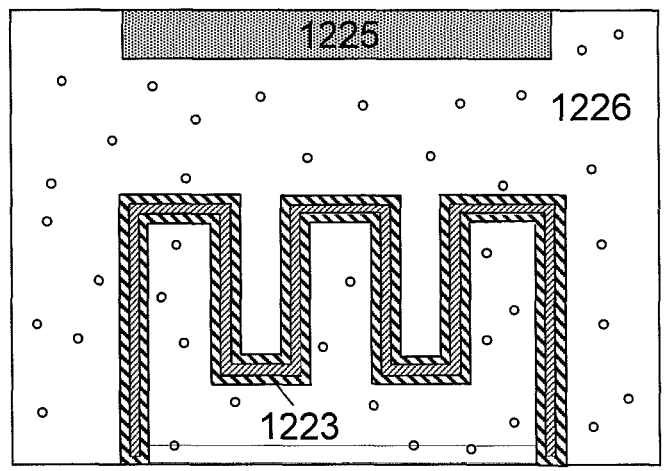
FIG. 12 illustrates schematically an electrical storage apparatus comprising the apparatus described herein.

FIG. 12 shows a lithium battery 1224 comprising the electrode 1223 described herein. In this example, the electrode 1223 serves as the anode and a planar electrode 1225 serves as the cathode. The anode 1223 and cathode 1225 are separated by an electrolyte 1226.

In one embodiment, the battery 1224 is a lithium sulphur battery in which the active material of the anode 1223 is lithium sulphide and the active material of the cathode 1225 is sulphur. Given that the electrical conductivity of sulphur is low, it may also need to be deposited onto a charge collector of electrically conductive material (such as the charge collector described previously). The electrolyte 1226 may be a solid electrolyte such as lithium phosphorous oxynitride (LiPON), a polymer electrolyte containing poly(ethylene oxide) derivatives, or a polymer electrolyte containing borate ester groups.

During discharge of the lithium-sulphur battery 1224, the lithium sulphide at the anode 1223 is split into lithium ions and sulphur, releasing electrons in the process. The lithium ions then migrate through the electrolyte 1226 to the sulphur cathode 1225 where they form lithium sulphide. During charging, on the other hand, the lithium sulphide at the cathode 1225 is converted back into sulphur and lithium ions, and the lithium ions migrate back through the electrolyte 1226 to the anode 1223 to produce lithium sulphide.

In another embodiment, the battery 1224 is a lithium-air battery in which the active material of the anode 1223 is lithium oxide and the cathode 1225 comprises porous carbon and a metal catalyst (such as manganese, cobalt, ruthenium, platinum, silver, or a mixture of cobalt and manganese). The electrolyte 1226 in this embodiment may be an organic electrolyte (such as $LiPF_6$, $LiAsF_6$, $LiN(SO_2CF_3)_2$, or $LiSO_3CF_3$), an aqueous electrolyte (comprising a lithium salt dissolved in water), or a combination of an organic electrolyte and an aqueous electrolyte separated by a lithium-conducting membrane.

During discharge of the lithium-air battery 1224, the lithium oxide at the anode 1223 is split into lithium ions and oxygen, releasing electrons in the process. The lithium ions then migrate through the electrolyte 1226 to the carbon cathode 1225 where they form lithium oxide. During charging, on the other hand, the lithium oxide at the cathode 1225 is converted back into oxygen and lithium ions, and the lithium ions migrate back through the electrolyte 1226 to the anode 1223 to produce lithium oxide.

Although FIG. 12 has been described above in relation to lithium-sulphur and lithium-air batteries, the electrode 1223 described herein is not limited to these specific applications. For example, the electrode 1223 of FIG. 12 could actually form the cathode of a lithium-ion battery. In this scenario, the active material of the electrode 1223 could, for example, comprise lithium cobalt oxide, lithium iron phosphate or lithium manganese oxide; the anode 1225 could comprise graphite; and the electrolyte 1226 could comprise a lithium salt (such as lithium hexafluorophosphate, lithium hexafluoroarsenate monohydrate, lithium perchlorate, lithium tetrafluoroborate, or lithium triflate) in an organic solvent (such as ethylene carbonate or diethyl carbonate).

On the other hand, the electrode 1223 of FIG. 12 could form the anode of a lithium-ion capacitor. In this scenario, the active material of the electrode 1223 could, for example, comprise lithium cobalt oxide, lithium iron phosphate or lithium manganese oxide; the cathode 1225 could comprise activated carbon; and the electrolyte 1226 could comprise a lithium salt (such as lithium hexafluorophosphate, lithium hexafluoroarsenate monohydrate, lithium perchlorate, lithium tetrafluoroborate, or lithium triflate) in an organic solvent (such as ethylene carbonate or diethyl carbonate).

Figure 13:
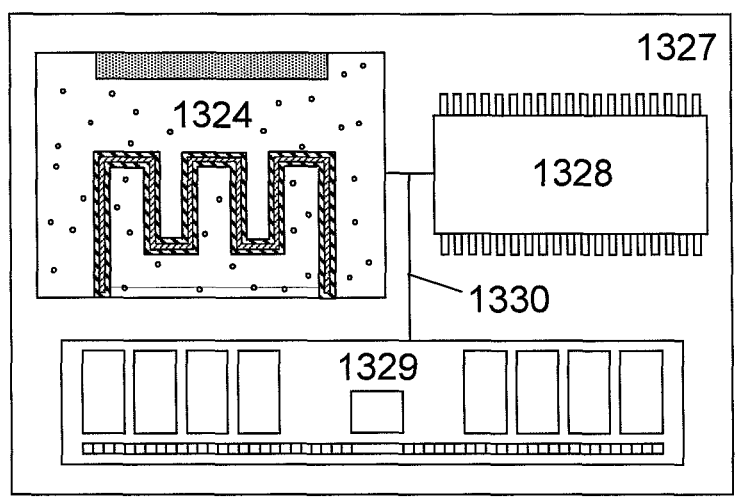
FIG. 13 illustrates schematically an electronic device comprising the electrical storage apparatus of FIG. 12.

FIG. 13 illustrates schematically a device 1327 comprising the electrical storage apparatus 1324 described herein. The device 1327 also comprises a processor 1328 and a storage medium 1329, which are electrically connected to one another by a data bus 1330. The device 1327 may be an electronic device, a portable electronic device, a portable telecommunications device, or a module for any of the aforementioned devices.

The electrical storage apparatus 1324 is configured to generate and/or store electrical energy, which may be used to power one or more components of the device 1327. The processor 1328 is configured for general operation of the device 1327 by providing signalling to, and receiving signalling from, the other device components to manage their operation. The storage medium 1329 is configured to store computer code configured to perform, control or enable operation of the electrical storage apparatus 1324. The storage medium 1329 may also be configured to store settings for the other device components. The processor 1328 may access the storage medium 1329 to retrieve the component settings in order to manage the operation of the device components. In particular, the storage medium 1329 may comprise voltage settings for charging the electrical storage apparatus 1324. The storage medium 1329 may be a temporary storage medium such as a volatile random access memory. On the other hand, the storage medium 1329 may be a permanent storage medium such as a hard disk drive, a flash memory, or a non-volatile random access memory.

Figure 14:
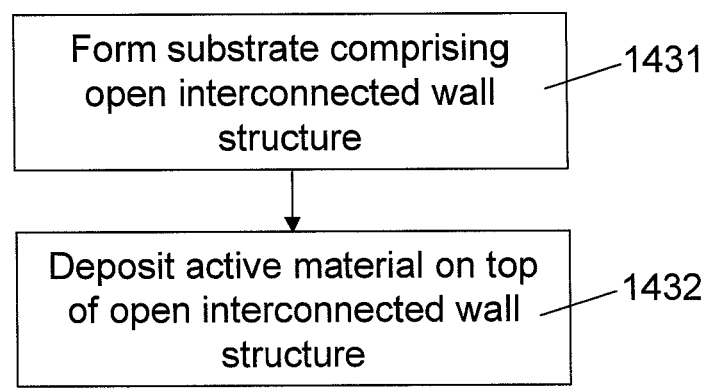
FIG. 14 illustrates schematically a method of making the apparatus described herein.

The main steps 1431-1432 of the method used to make the lithium-based electrode 1223 are illustrated schematically in FIG. 14.

Figure 15:
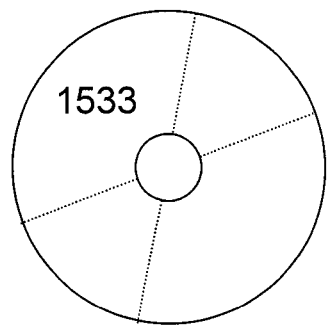
FIG. 15 illustrates schematically a computer readable medium providing a program for controlling the method of FIG. 14.

FIG. 15 illustrates schematically a computer/processor readable medium 1533 providing a computer program according to one embodiment. In this example, the computer/processor readable medium 1533 is a disc such as a digital versatile disc (DVD) or a compact disc (CD). In other embodiments, the computer/processor readable medium 1533 may be any medium that has been programmed in such a way as to carry out an inventive function. The computer/processor readable medium 1533 may be a removable memory device such as a memory stick or memory card (SD, mini SD or micro SD).

The computer program may comprise computer code configured to perform, control or enable deposition of an active material on top of a substrate comprising an open interconnected wall structure of electrically conductive material having one or more pores, wherein the active material comprises an electrically insulating lithium-based compound configured for use in generating and/or storing electrons, and wherein the open interconnected wall structure is configured to act as a charge collector for the generated and/or stored electrons through which an electrical path for the electrons is provided.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a substrate and an active material, the substrate comprising an open interconnected wall structure of electrically conductive material having one or more pores, the open interconnected wall structure providing the substrate upon which the active material is supported, wherein the active material comprises an electrically insulating lithium-based compound comprising lithium sulphide configured for use in generating and/or storing electrons, and wherein the open interconnected wall structure is configured to act as a charge collector for the generated and/or stored electrons through which an electrical path for the electrons is provided;

wherein the open interconnected wall structure of electrically conductive material has a gyroid structure defined by a configuration of spherical particles that form a lattice and is trigonometrically approximated by the equation $$\cos x \cdot \sin y + \cos y \cdot \sin z + \cos z \cdot \sin x = 0.$$

2. The apparatus of claim 1, wherein the substrate is formed from an open interconnected wall structure of electrically conductive material.

3. The apparatus of claim 1, wherein some or all of the pores form blind channels within the substrate.

4. The apparatus of claim 1, wherein some or all of the pores have a diameter of between 2 nm and 50 nm.

5. The apparatus of claim 1, wherein the insulating lithium-based compound further comprises lithium oxide.

6. The apparatus of claim 1, wherein the active material forms a coating on the open interconnected wall structure of electrically conductive material.

7. The apparatus of claim 1, wherein the electrically conductive material comprises one or more of a metal and a semiconductor.

8. The apparatus of claim 7, wherein the metal comprises one or more of gold, silver, nickel and copper.

9. The apparatus of claim 1, wherein the apparatus is one or more of an electrical storage apparatus and an electrode for an electrical storage apparatus.

10. The apparatus of claim 9, wherein the electrical storage apparatus is one or more of a lithium-sulphur battery and a lithium-air battery.

* * * * *